(12) United States Patent
Davidson (10) Patent No.: US 7,255,127 B2
(45) Date of Patent: Aug. 14, 2007

(54) VACUUM REGULATOR AND INTERMITTENT FLOW DEVICE

(76) Inventor: Gilbert Davidson, 14099 Buckhorn Dr., Carmel, IN (US) 46032

( * ) Notice: Subject to any disclaimer, the term of this patent is extended or adjusted under 35 U.S.C. 154(b) by 283 days.

(21) Appl. No.: 11/129,728

(22) Filed: May 16, 2005

(65) Prior Publication Data
US 2006/0254652 A1    Nov. 16, 2006

(51) Int. Cl.
G05D 16/10    (2006.01)
(52) U.S. Cl. ............ 137/495; 137/505.13; 137/505.25; 137/557; 137/599.09; 137/907
(58) Field of Classification Search ................. 137/495, 137/505, 505.13, 505.25, 557, 599.09, 907
See application file for complete search history.

(56) References Cited

U.S. PATENT DOCUMENTS

| 614,441 | A | * | 11/1898 | Burnett ................... | 137/505.25 |
| 4,467,828 | A | * | 8/1984 | Gneiding ............... | 137/505.25 |
| 4,903,726 | A | * | 2/1990 | Martin et al. .......... | 137/505.13 |
| 6,158,457 | A | * | 12/2000 | Byrd et al. ............ | 137/505.25 |

FOREIGN PATENT DOCUMENTS

EP    340173    * 11/1989

* cited by examiner

Primary Examiner—Stephen M. Hepperle
(74) Attorney, Agent, or Firm—Kyle S. Brant (57) ABSTRACT

A vacuum regulator and intermittent flow device are disclosed. Vacuum regulation is achieved via spring forces acting on a movable piston-tube assembly disposed within a regulator body having a cylindrical hollow interior. Vacuum is supplied to an input port and regulated vacuum is provided at an output port. Vacuum at the output is cut off when fluid flow is sufficiently restricted and the piston-tube assembly is urged in contact against a fluid flow aperture within the regulator body thereby blocking fluid flow. Multiple modes of operation are provided in the regulator by way of a three position mode knob that enables regulated vacuum, unregulated vacuum and an "off" mode of operation. The disclosed intermittent vacuum flow device is attached to the output of the vacuum regulator and enables timed cyclical on and off operation of vacuum regulation.

22 Claims, 9 Drawing Sheets

VACUUM REGULATOR AND INTERMITTENT FLOW DEVICE

FIELD OF THE INVENTION

This invention relates in general to pressure regulation devices, and more specifically to vacuum regulator devices and intermittent flow devices for use with vacuum regulators.

BACKGROUND OF THE INVENTION

Vacuum regulators are well known in the gas pressure regulation and flow control industry. A variety of such devices have been developed over the years. Such devices are used in many applications, and medical applications are one of the more familiar, for example, where "suction" is required for removal of fluid from surgical incisions or breathing passageways wherein the vacuum applied must be limited to prevent damage or injury to soft tissues of the patient. Manufacturing processes are another known application for vacuum regulators.

Prior art vacuum regulation devices used in the medical field are fairly expensive to produce and maintain. Soaring medical industry costs demand a less expensive alternative. Further, it is often a requirement that vacuum applied in a medical application be supplied in an intermittent fashion, i.e., vacuum applied for a predetermined number of seconds, and then off for fixed or variable period of time in an intermittent cyclical fashion. A device with a related objective is disclosed in my prior U.S. Pat. No. 5,785,050 entitled Oxygen Valve System. The '050 device functions to conserve oxygen by intermittently enabling and disabling pressurized oxygen delivery from a pressure regulation device coupled to a high pressure oxygen tank.

What is needed is a vacuum regulator that is less expensive to produce, meets medical industry standards, that includes an internal vacuum gauge providing impact protection and that provides an intermittent flow capability.

SUMMARY OF THE INVENTION

A vacuum regulation device, according to one aspect of the present invention, comprises a body having a cylindrical hollow interior, a source aperture in fluid communication with the cylindrical hollow interior, an output aperture in fluid communication with the cylindrical hollow interior, and a vent aperture in fluid communication with the cylindrical hollow interior, a piston assembly comprised of a piston movably disposed in and sized to mate with the lateral surface of the cylindrical hollow interior and establish a fluid seal therebetween, the piston assembly including a hollow tube having a first end and a second end and attached to and extending through the piston and situated substantially parallel with the direction of movement of the piston, and wherein the piston divides the cylindrical hollow interior into a first fluid chamber in fluid communication with the source aperture and a second fluid chamber in fluid communication with the output aperture and the vent aperture, and the tube movably engaging the output aperture adjacent the second end of the tube and forming a fluid seal therebetween, and wherein the piston assembly is movable so that the first end of the tube is positionable to contact the body at a seal location within the first fluid chamber and establish a fluid seal therebetween, and a spring disposed within the first fluid chamber and in contact with the piston assembly and the interior of the body, the spring urging the piston assembly toward the output aperture.

One object of the present invention is to provide an improved vacuum regulator.

Another object of the present invention is to provide an improved vacuum regulator with an internal gauge that is securely protected from damage.

Still another object of the present invention is to provide a more economically produced vacuum regulator.

Yet another object of the present invention is to provide an improved vacuum regulator with three operational modes including regulated, unregulated and shut-off modes.

These and other objects of the present invention will become more apparent from the following description of the preferred embodiment.

DESCRIPTION OF THE PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Figure 1:
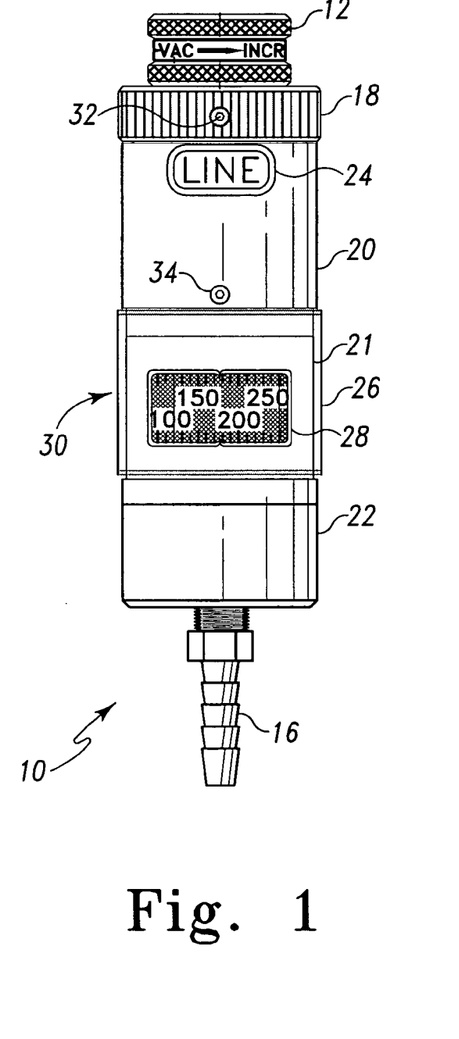
FIG. 1 is a front elevational view of a vacuum regulator according to the present invention.
Figure 2:
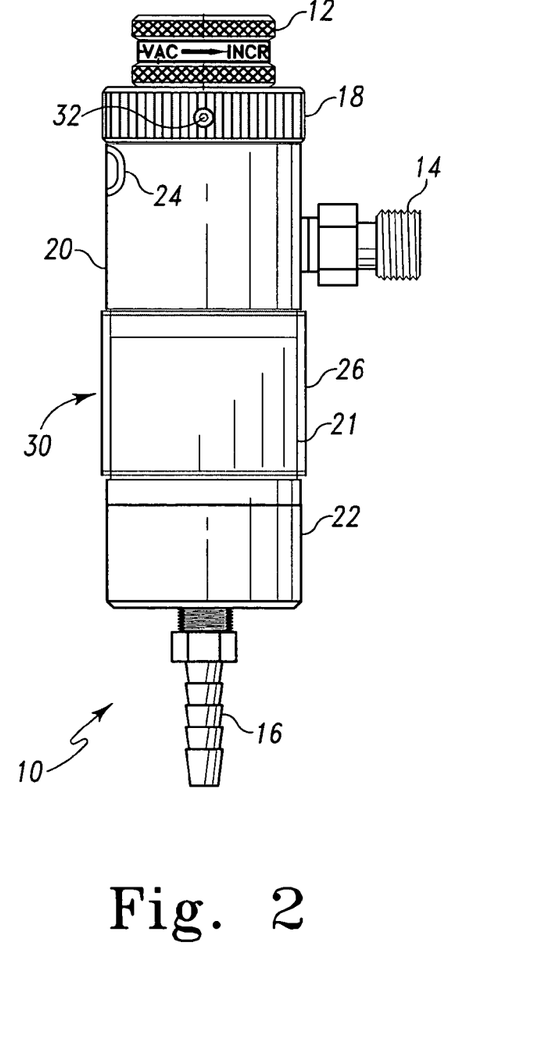
FIG. 2 is a side elevational view of the vacuum regulator of FIG. 1.

Referring now to FIGS. 1 and 2, a vacuum regulator 10 according to one aspect of the present invention is shown. FIG. 1 is a front elevational view and FIG. 2 is a side elevational view of vacuum regulator 10. Regulator 10 includes a vacuum regulation knob 12 that is rotatable to increase or decrease the vacuum regulation pressure level of vacuum supplied at output fitting 16. A source of vacuum is connected to fitting 14. Regulated vacuum is produced by regulator 10 at output fitting 16. Regulator 10 also includes a mode knob 18 that is rotatably positioned in one of three distinct angular positions in order to activate one of three different modes of operation of regulator 10. The three modes of operation include: 1) regulated vacuum operational mode wherein regulated vacuum is supplied to fitting 16; 2) unregulated operational mode wherein vacuum supplied at fitting 14 is routed directly to output fitting 16; and 3) a shutoff or "off" mode wherein fluid flow through regulator 10 is interrupted and no vacuum is supplied at fitting 16. Body or housing 20 and gauge body or housing 21 are attached via a threaded interface and contain the operational mechanical components of regulator 10. End cap 22 is attached to gauge housing 21 via a machine thread interface. Fitting 16 is attached to end cap 22 via a machine thread interface. Window 24 provides a viewport aperture through regulator body 20 to enable the user to view markings or inscriptions on mode knob 18 corresponding to the current mode of operation of regulator 10. A transparent plastic cylindrical shield 26 is situated over gauge body 21 and provides protection and a fluid seal for vacuum regulator gauge 30 contained within gauge body 21. Vacuum pressure levels are displayed on gauge 30, which is visible through aperture or window 28 in body 21. Set screws 32 are threaded into mode knob 18 and engage a slot (shown in FIG. 3) in vacuum regulation knob 12 to secure knob 12 in rotatable position with respect to mode knob 18. Set screws 34 secure mode knob 18 in rotatable position to body 20.

Operationally speaking, a source of vacuum is attached to fitting 14. Mode knob 18 is positioned into one of three possible operational modes. For typical operation, mode knob 18 is rotationally positioned into the vacuum regulation mode position. Fluid flow through fitting 16 is blocked by the user while the user adjusts the desired vacuum regulation level by rotating vacuum regulation knob 12 and viewing vacuum level indications on gauge 30. Mode knob 18 is also positionable in a vacuum bypass position wherein vacuum supplied at fitting 14 is routed directly through device 10 without any regulation and supplied to the output of fitting 16. A third mode of operation is selectable by rotating mode knob 18 to a position wherein vacuum supplied at fitting 14 is blocked from flowing through regulator 10.

Figure 3:
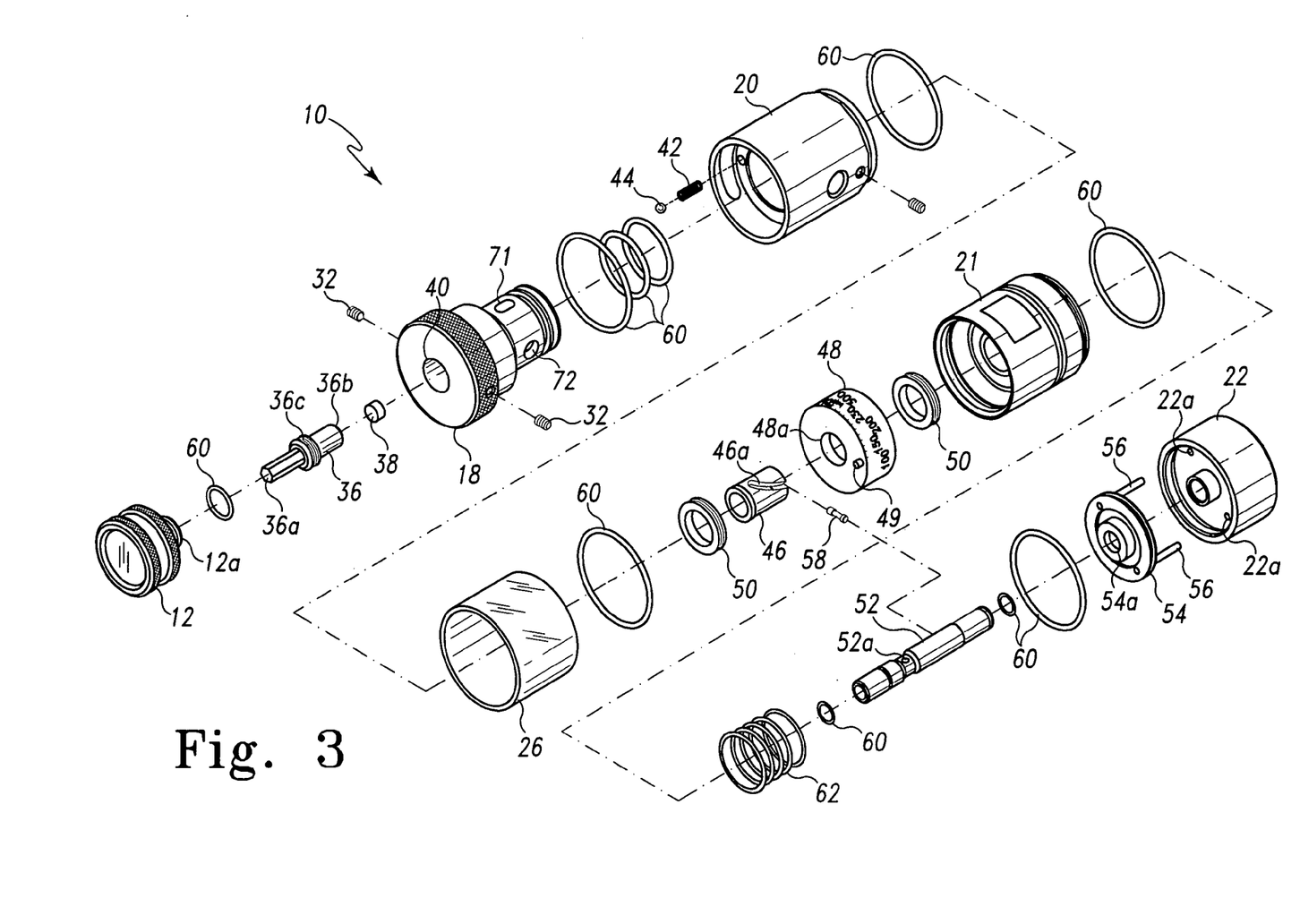
FIG. 3 is an isometric exploded view of the vacuum regulator of FIG. 1.
Figure 4:
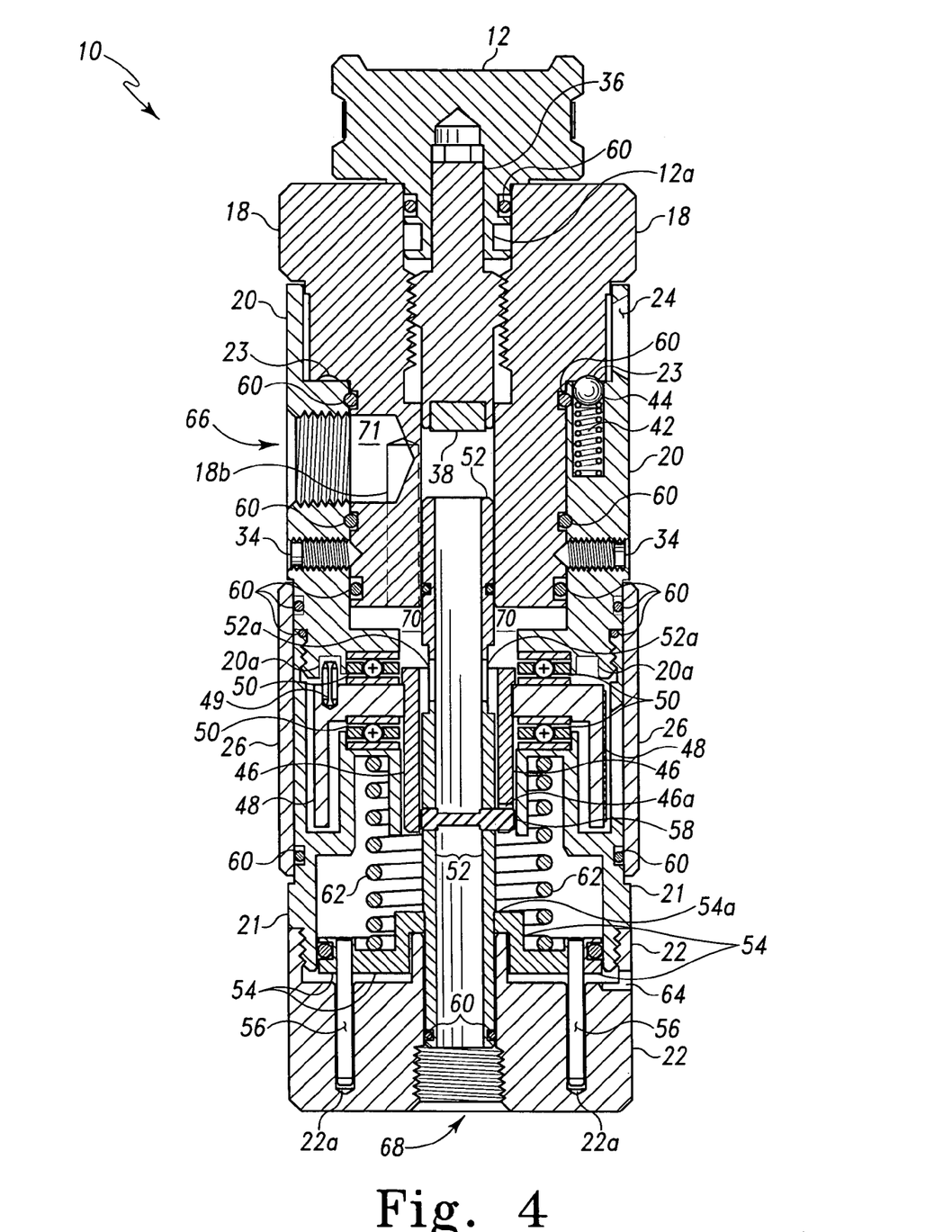
FIG. 4 is a cross-sectional view of the vacuum regulator of FIG. 1 shown in vacuum bypass operational mode.
Figure 5:
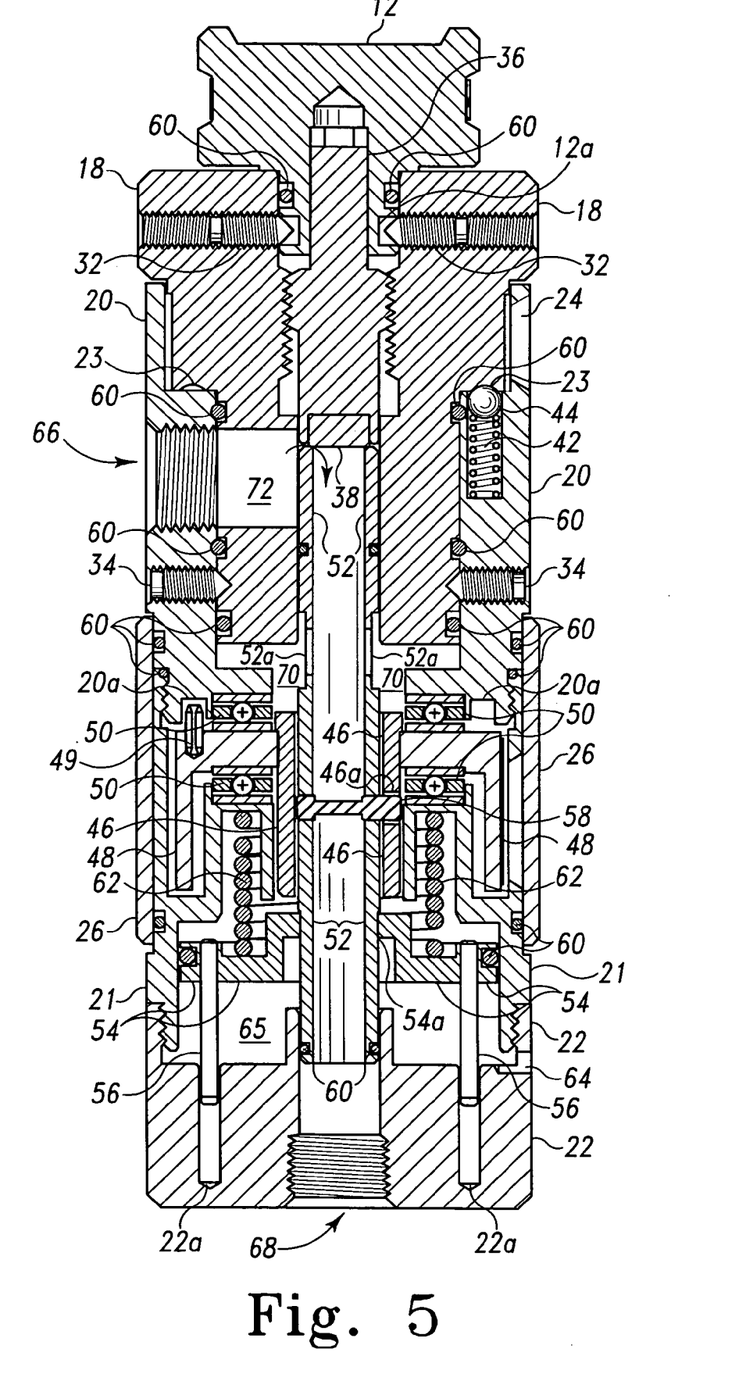
FIG. 5 is a cross-sectional view of the vacuum regulator of FIG. 1 shown in vacuum regulation mode.

Referring now to FIGS. 3, 4 and 5, an exploded perspective view of vacuum regulator 10 (FIG. 3) and two cross-sectional views of regulator 10 (FIGS. 4 and 5) are shown. FIG. 4 depicts regulator 10 in the vacuum bypass operational mode and FIG. 5 depicts regulator 10 in vacuum regulation operational mode. Vacuum regulation knob 12 engages plug 36 at 36a via a hexagonal mechanical interface. Knob 12 movably receives plug 36 into a hexagonal aperture (not shown) in knob 12 so that plug 36 moves freely in an axial direction therein. Seal 38 is disposed and attached in a recess within plug 36 at 36b. Plug 36 is disposed in aperture 40 of mode knob 18 and maintained in position via threads 36c that mate with internal threads within aperture 40. Set screws 32 engage a slot at 12a in knob 12 to rotatably retain knob 12 in position within respect to mode knob 18. Spring 42 is positioned within body 20 into an aperture shown in FIG. 5, and ball 44 abuts spring 42. Ball 44 is urged against mode knob 18 to provide tactile and audible feedback to the user when ball 44 engages detents 23 in knob 18. Detents 23 are positioned so that the three modes of operation of regulator 10 are activated when ball 44 engages detents 23. Cylindrical Plastic shield 26 is disposed over gauge body 21. Inner gauge cylinder 46 is inserted into aperture 48a of outer gauge cylinder 48 and is attached to cylinder 48. Dowel pin 49 is rotatably retained in an annular slot of housing 20 at location 20a. Bearings 50 are situated adjacent the upper and lower surfaces of outer gauge cylinder 48 to facilitate free rotational movement of inner and outer gauge cylinders 46 and 48 within gauge body 21. Tube 52 is received into an aperture in piston 54. Tube 52 is securely attached to and fluidly sealed within aperture 54a in piston 54 to form a piston assembly. Tube 52 includes two transverse apertures 52a. Dowel pins 56 are preferably interference fit attached to apertures in piston 54. End cap 22 includes apertures at 22a that receive dowel pins 56. Dowel pins 56 engage apertures 22a in end cap 22 and prevent rotation of piston 54 within the chamber defined by end cap 22 and gauge body 21. Pin 58 is securely attached to tube 52 and engages helical slot 46a of inner gauge cylinder 46. Seal 38 is attached in a recess in the lower end of plug 36. An aperture 64 in end cap 22 enables atmospheric air to enter into or exit from chamber 65 beneath piston 54. A plurality of o-rings 60 are depicted that provide a fluid seal between adjacent components as shown in FIGS. 4 and 5.

Referring to FIG. 4, mode knob 18 is shown positioned in the vacuum bypass mode of operation. FIG. 4 depicts regulator 10 with fittings 14 and 16 (shown in FIG. 1) removed. Fitting 16 is attached to end cap 22 via a threaded interface in aperture 68. Fitting 14 is attached to housing 20 via a threaded interface in aperture 66.

Figure 6:
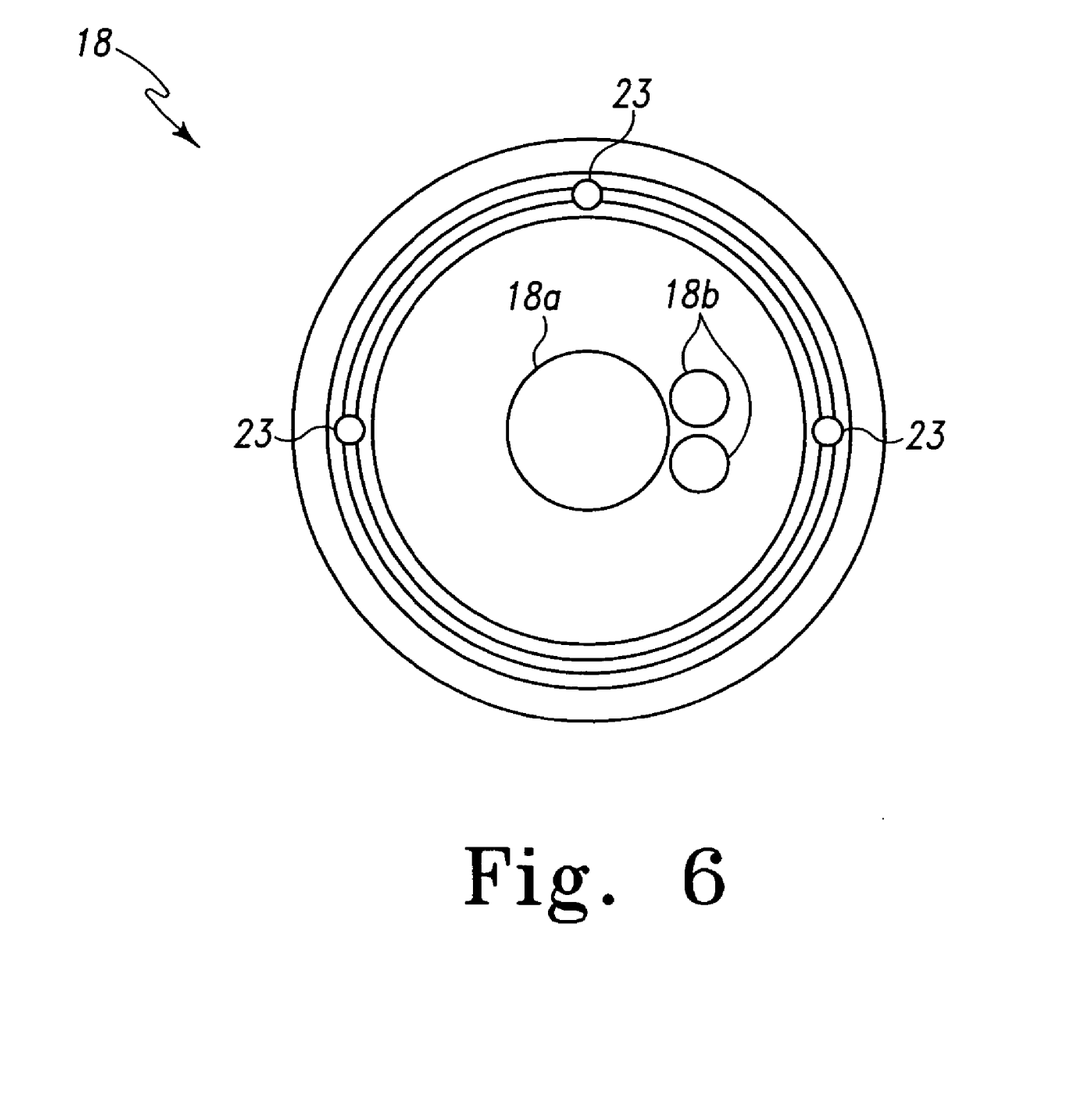
FIG. 6 is a bottom view of mode knob 18.

A source of vacuum is supplied at input port 66 and a fluid flow path is present that includes aperture 71 in mode knob 18, apertures 18b (see FIG. 6) that are in fluid communication with aperture 71 of mode knob 18, and aperture or chamber 70. Aperture 70 is in fluid communication with the interior of tube 52 via apertures 52a of tube 52. Thus, a fluid flow path is defined that includes input port 66, aperture 71, aperture 18b, chamber 70, apertures 52a and output port 68. Piston 54 and attached tube 52 are movably disposed within regulator 10. Regardless of the vertical position of piston 54 and tube 52, apertures 52a will be in fluid communication with chamber 70 and vacuum supplied to the input port 66 will be routed through regulator 10 to the output port 68 when vacuum bypass operation mode is selected via mode knob 18.

Referring now to FIG. 5, regulator 10 is shown in a vacuum regulation mode of operation. In vacuum regulation mode, regulator 10 limits vacuum levels supplied at output port 68. Mode knob 18 is positioned so that vacuum at input aperture 66 in fluid communication with aperture 72 is supplied over the upper portion of tube 52 and into the interior of tube 52 when tube 52 is positioned away from seal 38. If the pressure differential within tube 52 versus the pressure beneath piston 54 in aperture 65 (at atmospheric pressure) is sufficient to overcome the force of spring 62, then the piston assembly comprised of piston 54, tube 52 and dowel pins 56 is moved toward seal 38 attached to plug 36. When the pressure differential is sufficiently high, piston 54 is forced upward until tube 52 mechanically engages seal 38, at which point vacuum flow from aperture 72 into the interior of tube 52 is cutoff. Plug 36 is rotatable so that the vertical position of seal 38 with respect to mode knob 18 may be changed by the user. Raising and lowering the position of seal 38 alters the vertical position or location wherein tube 52 contacts seal 38 and thereby establishes a means to adjust the precise vacuum level at which tube 52 contacts seal 38. Lowering the position of seal 38 will result in a lower pressure differential between aperture 65 and the interior of tube 52 at which tube 52 contacts seal 38. Conversely, raising the position of seal 38 with respect to mode knob 18 will command a higher differential pressure force between chamber 65 and the interior of tube 52 to overcome the resistive force of spring 62 and urge piston 54 and tube 52 upwards so that tube 52 contacts seal 38 thereby cutting off fluid flow through tube 52. Vacuum levels within tube 52 are supplied to output port 68 where output fitting 16 (shown in FIG. 1) is mechanically attached.

Tube 52 moves axially or vertically in response to pressure differentials as discussed above. The vertical position of tube 52 is used to mechanically actuate gauge cylinder 46. Pin 58, attached to tube 52, engages helical slot 46a (FIG. 3) of inner gauge cylinder 46. Vertical movement of pin 58 urges inner gauge cylinder 46 to rotate. Inner gauge cylinder 46 is attached to outer gauge cylinder 48. Outer gauge cylinder 48 is rotatably maintained in position between bearings 50 to so that relatively low force is required to rotate the gauge assembly 30 (FIG. 1) consisting of inner gauge cylinder 46 and outer gauge cylinder 48. The numerical pressure indications are inscribed on the outer lateral surface of gauge cylinder 48 (see FIG. 3) preferably a decal with numerical information is attached to the outer surface of cylinder 48. The pressure indications on the outer surface of cylinder 48 are calibrated to correspond with the fluid pressure level supplied at output port 68 taking into account the force of spring 62.

Mode knob 18 is positionable so that neither aperture 71 nor aperture 72 are aligned with input aperture 66. When so positioned, mode knob 18 blocks fluid flow though regulator 10 to achieve an "off" mode of operation.

The anti-rotation functionality of dowel pins 56 and apertures 22a to prevent rotation of piston 54 during normal operation of regulator 10 may be achieved using any of a number of alternative techniques. A protrusion from tube 52 or from piston 54 engaging a corresponding retaining slot in end cap 22 or housing 21 would serve to produce identical functionality. Alternatively, a transverse pin situated in output port 68 and a mating slot in the end of tube 52 would provide the desired functionality. In addition, tube 52 might be constructed with a hexagonal cross-section at one end to mate with a hexagonal opening at aperture 68.

A majority of the components of vacuum regulator 10 are constructed of metal such as aluminum or brass, though other materials having suitable properties are contemplated. Set screws 32 and 34 are made from steel, other suitable metals or man made materials. O-rings 60 are made of suitable rubber-like compressible and resilient materials well known in the art that provide a fluid seal between adjacent components. Outer gauge cylinder 48 is made of plastic or metal, plastic being preferred to reduce weight. Clear shield 26 is made of clear plastic material. Spring 62 is made from suitable spring steel, though other resilient man made compounds such as plastics are contemplated. Seal 38 is made of a resilient rubber-like compound similar to that used for o-rings 60.

Figure 7:
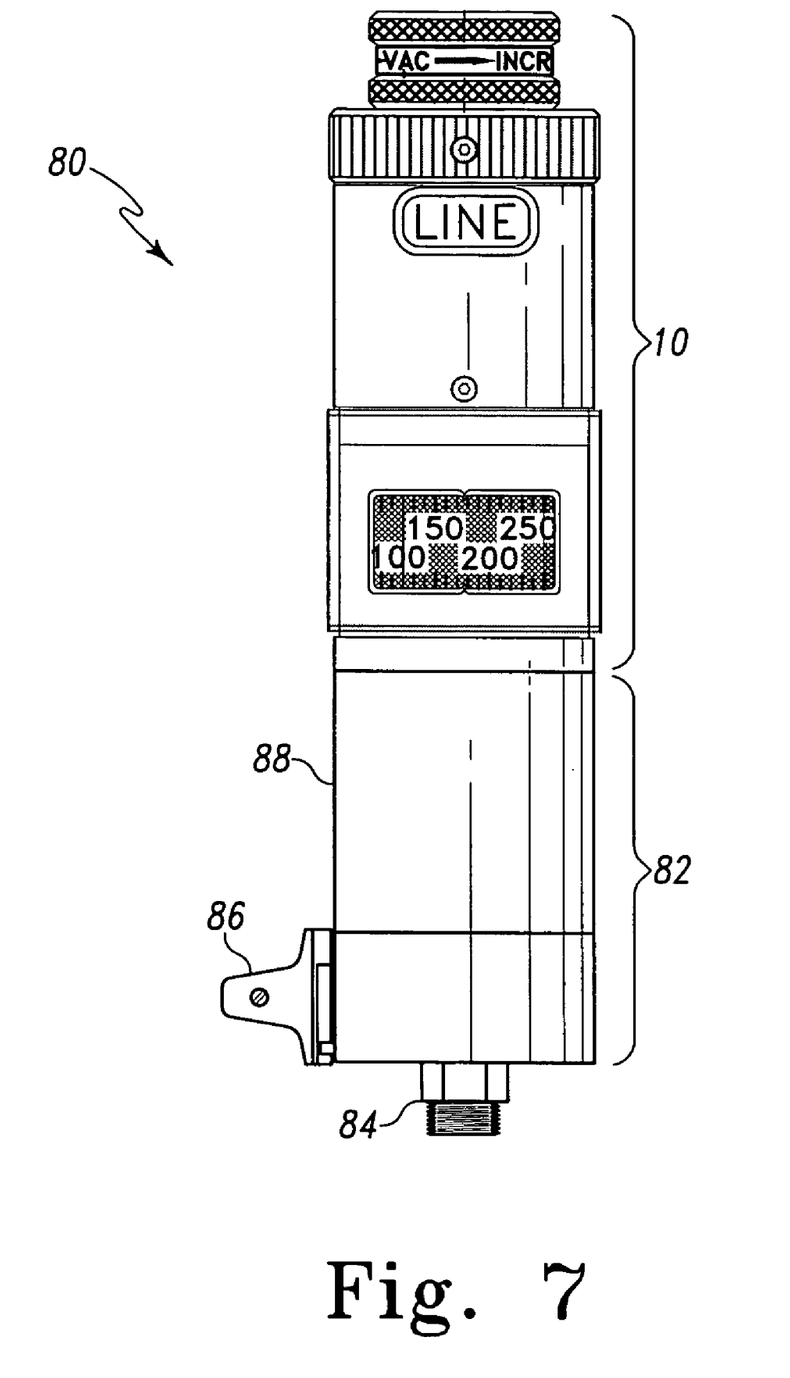
FIG. 7 is front elevational view of a vacuum regulator with intermittent flow device according to the present invention.
Figure 8:
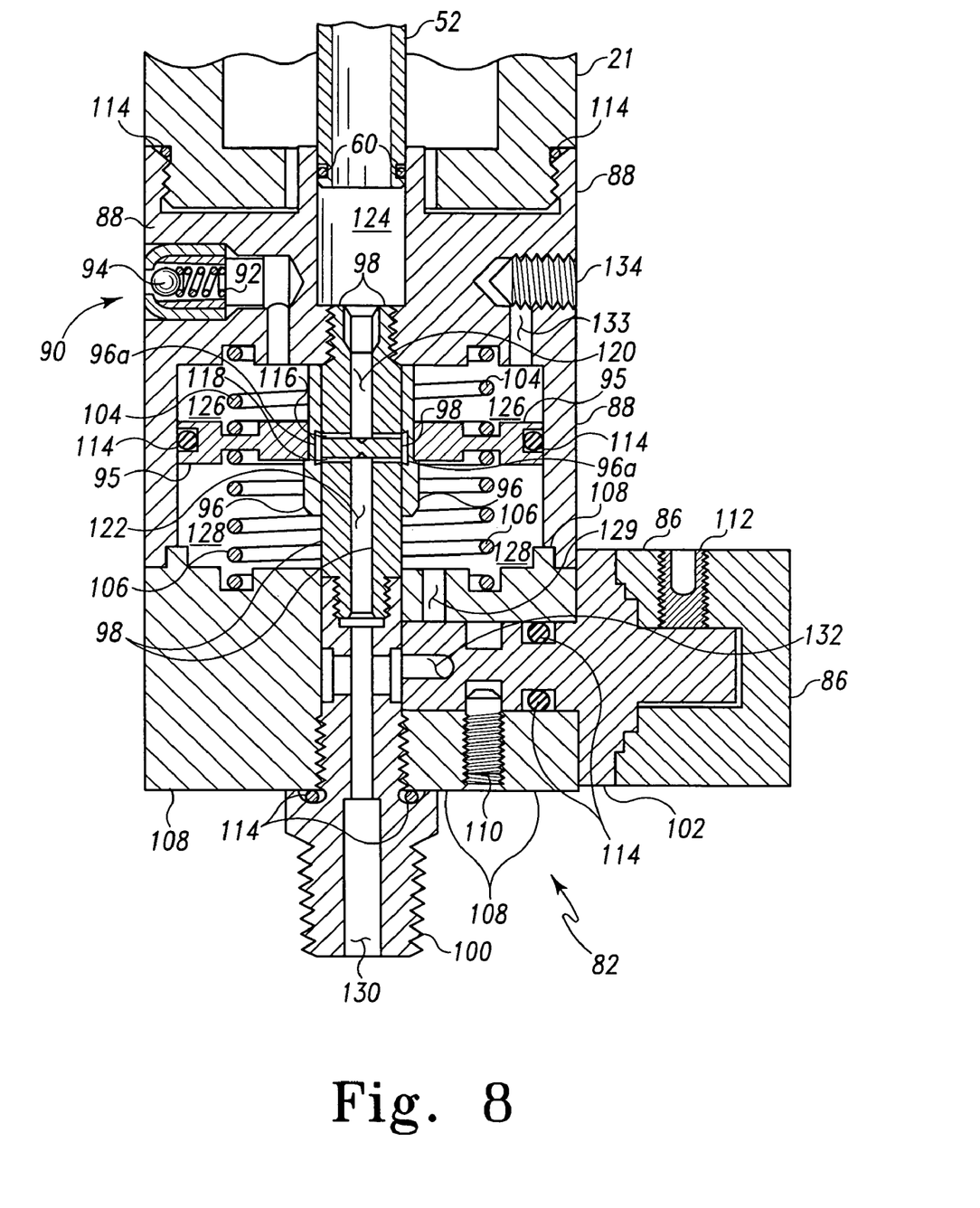
FIG. 8 is a partial cross-sectional view of the vacuum regulator with intermittent flow device of FIG. 7.
Figure 9:
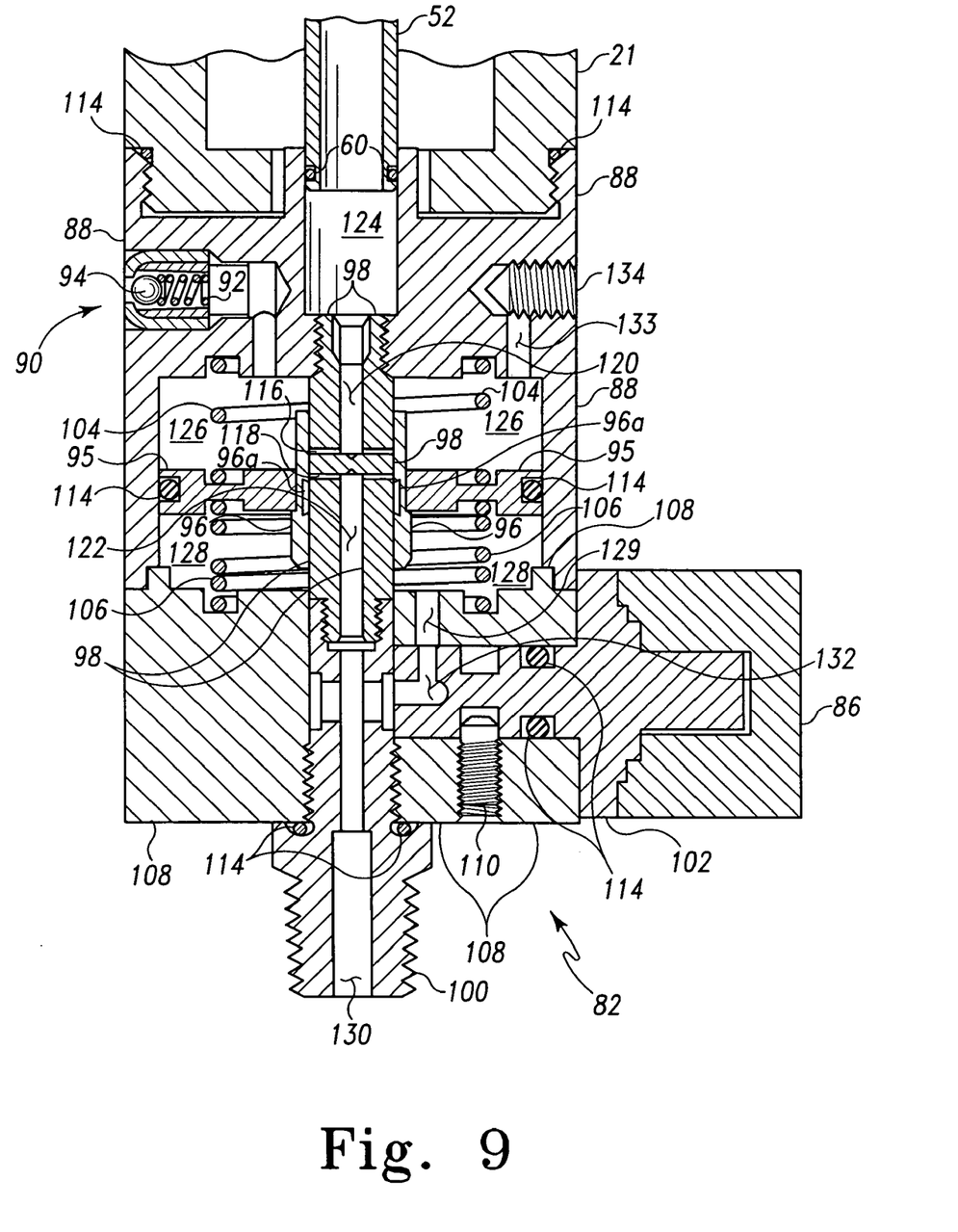
FIG. 9 is another partial cross-sectional view of the regulator with intermittent flow device.
Figure 10:
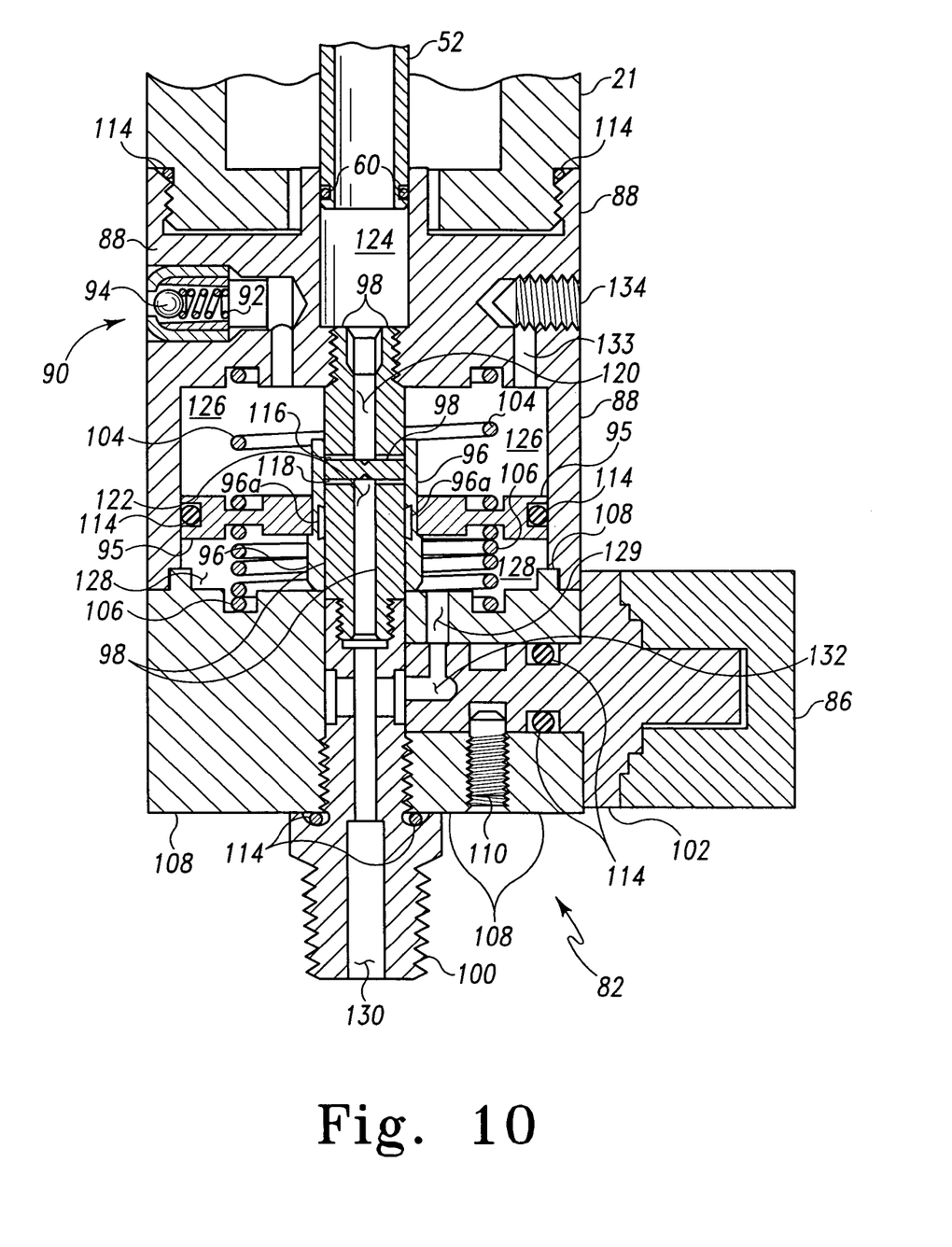
FIG. 10 is a third partial cross-sectional view of the regulator with intermittent flow device.

Referring now to FIG. 7, another embodiment 80 of a vacuum regulator according to the present invention is shown. Vacuum regulator 80 includes vacuum regulator 10 and intermittent flow device 82. Vacuum regulator 10 is identical to the device shown in FIGS. 1-6 with the exception that end cap 22 of device 10 is removed and intermittent flow device 82 is attached to gauge housing 21 of regulator 10 in its place via a threaded interface as shown in FIGS. 8-10. Housing 88 of device 82 is substituted in place of end cap 22 and includes apertures (not shown) to receive dowel pins 56 (see FIGS. 3-5). Regulator 10 provides a vacuum regulation function as described above. Intermittent flow device 82 enables and disables fluid flow supplied at output fitting 84 in a cyclical fashion. Control knob 86 is positionable to enable or disable the intermittent cyclical flow control functionality of intermittent flow device 82.

Referring now to FIGS. 8-10, three cross-sectional views of intermittent flow device 82 are shown. FIG. 8 depicts device 82 in its equilibrium position. FIGS. 9 and 10 depict device 82 in a state where fluid flow therethrough is interrupted as a result of vacuum introduced into aperture 124. Device 82 includes body or housing 88, check valve 90 including spring 92 and ball 94, disk-shaped piston 95, cylindrical shuttle 96, tube 98, cylindrical adapter fitting 100, knob 86, cylindrical flow control shaft 102, shuttle springs 104 and 106, and end cap 108. Set screw 110 secures shaft 102 in rotatably fixed position within end cap 108. Set screw 112 secures knob 86 to shaft 102. Hollow tube 98 is secured in position via a threaded interface with adapter fitting 100. Housing 88 is attached to tube 98 via a threaded interface. A shuttle assembly consisting of shuttle 96 attached to piston 95 is situated about tube 98 as shown. Shuttle 96 moves freely on tube 98. A plurality of o-rings 114 provide a fluid seal between components abutting same. Tube 98 includes an upper transverse aperture at 116 and a lower transverse aperture at 118. Apertures 116 and 118 are not in fluid communication within tube 98. Tube 98 also includes axial apertures 120 and 122. As shown in FIG. 8, axial aperture 120 is in fluid communication with transverse aperture 116 and axial aperture 122 is in fluid communication with transverse aperture 118. Vacuum enters device 82 through aperture 124, which is in fluid communication with the output aperture of attached vacuum regulator 10.

Since end cap 22 is removed and intermittent flow device 82 is attached to gauge housing 21 of regulator 10, the functionality and features of end cap 22 must be provided for in the design of device 82. Dowel pins 56 of regulator 10 are received in corresponding apertures (not shown) in housing or body 88. The apertures are not visible in FIGS. 8-10 due to the particular angle of the cross-section. Tube 52 is received into aperture 124 of body 88 and a fluid seal is established therebetween by o-ring 60.

Operationally speaking, springs 104 and 106 maintain shuttle 96 in an equilibrium position on tube 98 as shown in FIG. 8. Shuttle 96 moves freely on tube 98. Forces created by fluid pressure differentials in chambers 126 and 128 provide a source for moving forces that urge shuttle 96 away from its position of equilibrium. Knob 86 and flow control shaft 102 are shown in FIG. 8 in the "off" position wherein device 82 operates to allow uninterrupted flow between input aperture 124 and output aperture 130. Fluid flow through device 82 is achieved by positioning shuttle 96 so that transverse apertures 116 and 118 are in fluid communication via a notch 96a in shuttle 96 as shown in FIG. 8. A similar shuttle configuration is shown in my previously issued U.S. Pat. No. 5,785,050 and functions in device 82 similarly.

FIGS. 9 and 10 depict control shaft 102 in the "on" position that enables fluid flow between output aperture 130 and apertures 129 and 132. Aperture 132 is in fluid communication with chamber 128 adjacent shuttle 96 via aperture 129. When vacuum is present in aperture 130, the same vacuum appears in chamber 128 by way of connecting passageway or apertures 129 and 132. A vacuum in chamber 128 of sufficient magnitude to overcomes the mechanical force attributable to spring 106 will result in the shuttle assembly, consisting of shuttle 96 and piston 95, moving toward end cap 108 and compressing spring 106. As the shuttle assembly moves toward end cap 108, atmospheric pressure air is drawn into chamber 126 through check valve 90. When shuttle 96 is situated as shown in FIGS. 9 and 10, vacuum flow from input aperture 124 through apertures 116 and 118 is interrupted as notch 96a no longer provides a fluid communication path between apertures 116 and 118. One-way check valve 90 functions to allow air to enter into chamber 126 when shuttle 96 is displaced due to pressure differentials between chambers 128 and 126. Check valve 90 allows air in yet prevents air from escaping chamber 126. Once shuttle 96 has been moved to the positions shown in FIGS. 9 and 10, the vacuum supplied to chamber 128 is cutoff, and the force exerted by spring 106 on piston 95 forces air in chamber 126 to exit out aperture 133, which is in fluid communication with aperture 126. Set screw 134 is adjustable to control the rate at which air in aperture 133 is allowed to escape into the atmosphere. By varying the position of set screw 134 to control the rate of escape of air through aperture 133, the speed or time delay in which the shuttle assembly returns to the equilibrium position of FIG. 8 is variably controlled. Once shuttle 96 returns to the equilibrium position, as shown in FIG. 8, vacuum is once again supplied through device 82 to output aperture 130, and the shuttle movement cycle is reinitiated.

The components of device 82 are constructed of materials similar to those used in the construction of device 10, namely aluminum or brass for a majority of the components. Springs are made from spring steel, and o-ring seals are made of materials well known in the art. Set screws are made from steel or suitable substitute material.

Intermittent flow device 82 is intended for use with any commercially available vacuum regulator and need not be attached to regulator 10 as shown in FIG. 7. Substituting an end cap with mating threads, and having a fluid fitting attached thereto, in place of vacuum regulator 10 in device 80 will result in an intermittent flow device usable with any commercially known vacuum regulator.

While the invention has been illustrated and described in detail in the drawings and foregoing description of the preferred embodiments, the same is to be considered as illustrative and not restrictive in character, it being understood that only the preferred embodiments have been shown and described and that all changes and modifications that come within the spirit of the invention are desired to be protected.

What is claimed is:

1. A vacuum regulation device comprising:
   a body having a hollow cylindrical interior, a source aperture in fluid communication with said interior a vent aperture in fluid communication with said hollow cylindrical interior, and an output aperture in fluid communication with said hollow cylindrical interior;
   a cylindrically shaped piston movably disposed within said hollow cylindrical interior of said body and sized to establish a fluid seal with said hollow cylindrical interior of said body, said piston situated between said source aperture and said output aperture, said piston defining a first chamber within said body in fluid communication with said source aperture, said piston further defining a second chamber within said body in fluid communication with said vent aperture, said piston further including a piston aperture therethrough;
   a spring disposed within said first chamber and about said tube and situated in contact with said movable piston and the interior of said body, said spring urging said piston toward said output aperture;
   a hollow cylindrical tube attached to said piston to form a piston-tube assembly, said tube disposed in said piston aperture and attached to said piston such that the piston-tube interface includes a fluid seal therebetween, said tube extending into said first chamber and into said second chamber, said tube movably engaging said output aperture in said second chamber and forming a fluid seal therebetween; and
   wherein a source of vacuum is connected to said source aperture and said vacuum regulation device operates in a first mode of operation such that fluid flows into said output aperture, through said hollow tube and out said source aperture, and further wherein said vacuum regulation device operates in a second mode of operation wherein said output aperture is partially obstructed thereby reducing air flow therethrough and inducing a negative air pressure within said tube thereby urging said piston and said tube towards said spring and compressing said spring, and wherein said vacuum regulation device operates in a third mode of operation wherein said output aperture is substantially obstructed and said piston and said hollow tube are urged towards said spring within said hollow cylindrical interior and said tube makes contact with the interior of said body and limiting fluid flow through said tube.

2. The device of claim 1 including a pressure control member attached to said body and extending through said body at the location where said tube makes contact with the interior of said body, said pressure control member being fixedly movable to a plurality of positions to establish a plurality of mechanical stop positions against which said tube makes contact.

3. The device of claim 2 including pressure gauge means situated within the hollow interior of said body and responsive to the mechanical position of said piston-tube assembly for providing pressure information regarding the fluid pressure within said hollow tube.

4. The device of claim 3 wherein said piston-tube assembly includes a gauge protrusion extending outward therefrom, and said pressure gauge means includes a hollow cylindrical gauge member having a helical slot formed therein and wherein said gauge member is rotatably attached to and disposed within said body and situated about said tube within said first chamber, and wherein said gauge protrusion engages said helical slot, said gauge member including pressure information disposed on the lateral cylindrical surface thereof, and wherein said body includes a transparent window situated adjacent said cylindrical gauge member enabling viewing of said pressure information.

5. The device of claim 4 wherein said tube includes a transverse aperture therethrough establishing an additional fluid flow path into the interior of said hollow tube, and further including a mode knob having a first fluid passageway therethrough and a second fluid passageway therethrough, and wherein said mode knob is rotatably disposed in said first chamber about said tube to establish an upper first chamber and a lower first chamber, said mode knob establishing a fluid seal with said tube between said transverse aperture of said tube and the free end of said tube situated in said first chamber, and wherein said mode knob is rotatably positionable in a first position to align said first fluid passageway so that a fluid flow path is established between said source aperture and said upper first chamber, said mode knob being positionable in a second position to align said second fluid passageway to establish a fluid flow path between said source aperture and said lower first chamber.

6. The device of claim 5 including a gauge bearing situated within and attached to said body, and wherein said hollow cylindrical gauge member is rotatably mounted to said gauge bearing.

7. The device of claim 6 including means for preventing rotation of said piston-tube assembly, said means for preventing rotation having a first portion attached to said body and a second portion attached to said piston-tube assembly.

8. The device of claim 7 wherein said means for preventing rotation includes a rotation void in said body situated in said second chamber and a rotation protrusion extending outward from said piston-tube assembly and oriented in the direction of movement of said piston-tube assembly, and wherein said rotation protrusion is movably retained within said rotation void.

9. A vacuum regulation device comprising:
a body having a cylindrical hollow interior, a source aperture in fluid communication with said cylindrical hollow interior, an output aperture in fluid communication with said cylindrical hollow interior, and a vent aperture in fluid communication with said cylindrical hollow interior;
a piston assembly comprised of a piston movably disposed in and sized to mate with the lateral surface of said cylindrical hollow interior and establish a fluid seal therebetween, said piston assembly including a hollow tube having a first end and a second end and attached to and extending through said piston and situated substantially parallel with the direction of movement of said piston, and wherein said piston divides said cylindrical hollow interior into a first fluid chamber in fluid communication with said source aperture and a second fluid chamber in fluid communication with said vent aperture, and said tube movably engaging said output aperture in said second fliud chamber adjacent the second end of said tube and forming a fluid seal therebetween, and wherein said piston assembly is movable so that said first end of said tube is positionable to contact said body at a seal location within said first fluid chamber and establish a fluid seal therebetween; and
a spring disposed within said first fluid chamber and in contact with said piston assembly and the interior of said body, said spring urging said piston assembly toward said output aperture.

10. The device of claim 9 including a vacuum control member extending through said body at said seal location and movably attached to said body at said seal location, said vacuum control member including a tube mating surface adapted to engage said first end of said tube and establishing a fluid seal therebetween, said vacuum control member being positionable in a plurality of fixed positions to establish a plurality of locations for said seal location along an axis parallel to the axis of movement of said piston assembly.

11. The device of claim 10 further comprising a mode knob rotatably disposed within said first fluid chamber and adjacent said source aperture, said mode knob encircling said tube and establishing a fluid seal therewith at a location between the first end of said tube and said piston, said mode knob dividing said first fluid chamber to define an upper first fluid chamber and a lower first fluid chamber, said mode knob including a regulation fluid passageway and a bypass fluid passageway therethrough, and wherein in a first position of said mode knob said regulation fluid passageway is situated to establish fluid communication between said source aperture and said upper first fluid chamber, and in a second position of said mode knob said bypass fluid passageway is situated to establish fluid communication between said source aperture and said lower first fluid chamber, and wherein said tube includes a transverse aperture situated in and in fluid communication with said lower first fluid chamber.

12. The device of claim 11 wherein said mode knob is positionable in a third position wherein said source aperture is covered thereby preventing fluid flow therethrough.

13. The device of claim 11 including a hollow cylindrical gauge member having a helical slot formed therein and wherein said gauge member is rotatably attached to and disposed within said lower first fluid chamber of said body and about said tube, and wherein said piston assembly includes a gauge protrusion extending outward therefrom, and wherein said gauge protrusion engages said helical slot, said gauge member including pressure information disposed on the lateral cylindrical surface thereof, and wherein said body includes a transparent window situated adjacent said cylindrical gauge member enabling viewing of said pressure information.

14. The device of claim 13 including means for preventing rotation of said piston assembly, said means for preventing rotation having a first portion disposed on said body and a second portion disposed on said piston-tube assembly.

15. The device of claim 14 wherein said means for preventing rotation includes a rotation recess in said body and situated in said second chamber and a rotation protrusion extending outward from said piston assembly and oriented in the direction of movement of said piston assembly, and wherein said rotation protrusion is movably retained within said rotation recess.

16. The device of claim 15 including a gauge bearing having an inner race and an outer race, said gauge bearing situated within said body and wherein said outer race is attached to said body, and further wherein said hollow cylindrical gauge member is attached to said inner race.

17. A vacuum regulator device comprising:
a body having a cylindrical aperture therethrough having a first end and a second end, said body further including a source aperture in fluid communication with said cylindrical aperture;
a first cap attached to said body and disposed over and fluidly sealing said first end of said cylindrical aperture, said cap including a regulation member movably attached to said cap and extending into said cylindrical aperture, said regulation member being positionable into a plurality of fixed positions;
a piston assembly comprised of a piston movably disposed in and sized to mate with the lateral surface of said cylindrical aperture and establish a fluid seal therebetween, said piston assembly including a hollow tube having a first end and a second end and attached to and extending through said piston and situated substantially parallel with the direction of movement of said piston, and wherein said piston divides said cylindrical aperture into a first fluid chamber in fluid communication with said source aperture and a second fluid chamber, and wherein said piston assembly is movable so that said first end of said tube is positionable to contact said regulation member and establish a fluid seal therebetween;
a spring disposed within said first chamber and in contact with said piston assembly and the interior of said body, said spring urging said piston assembly toward said second end of said cylindrical aperture; and
a second cap having an output aperture and a vent aperture, said second cap attached to said body and disposed over and fluidly sealing said second end of said cylindrical aperture, and wherein said tube is disposed within and movably engages said output aperture adjacent the second end of said tube, said tube establishing a fluid seal with said second cap in said output aperture; and
connection means attached to and fluidly sealing said output aperture, said connection means providing a mechanism for attaching devices requiring a supply of vacuum to said vacuum regulator device.

18. The device of claim 17 further comprising a mode knob rotatably disposed within said first fluid chamber and adjacent said source aperture, said mode knob encircling said tube and establishing a fluid seal therewith at a location between the first end of said tube and said piston, said mode knob dividing said first fluid chamber to define an upper first fluid chamber and a lower first fluid chamber, said mode knob including a regulation fluid passageway and a bypass fluid passageway therethrough, and wherein in a first position of said mode knob said regulation fluid passageway is situated to establish fluid communication between said source aperture and said upper first fluid chamber, and in a second position of said mode knob said bypass fluid passageway is situated to establish fluid communication between said source aperture and said lower first fluid chamber, and wherein said tube includes a transverse aperture situated in and in fluid communication with said lower first fluid chamber.

19. The device of claim 18 wherein said mode knob is positionable in a third position wherein said source aperture is fluidly sealed thereby preventing fluid flow therethrough.

20. The device of claim 19 including a hollow cylindrical gauge member having a helical slot formed therein and wherein said gauge member is rotatably attached to and disposed within said lower first fluid chamber of said body and about said tube, and wherein said piston assembly includes a gauge protrusion extending outward therefrom, and wherein said gauge protrusion engages said helical slot, said gauge member including pressure information disposed on the lateral cylindrical surface thereof, and wherein said body includes a transparent fluidly sealed window situated adjacent said cylindrical gauge member enabling viewing of said pressure information.

21. The device of claim 20 including means for preventing rotation of said piston assembly, said means for preventing rotation having a first portion disposed on said body and a second portion disposed on said piston-tube assembly.

22. The device of claim 21 including a gauge bearing having an inner race and an outer race, said gauge bearing situated within said body and wherein said outer race is attached to said body, and further wherein said hollow cylindrical gauge member is attached to said inner race.

* * * * *